(12) United States Patent
Rohrer et al.

(10) Patent No.: US 6,749,743 B1
(45) Date of Patent: Jun. 15, 2004

(54) FUEL DIVERTER FOR A RECIRCULATING WASTEWATER TREATMENT SYSTEM

(75) Inventors: Kevin J. Rohrer, Versailles, MO (US); Theophilus B. Terry, III, Hodgenville, KY (US)

(73) Assignees: Zabel Industries International, Ltd., Louisville, KY (US); Harry L. Nurse, Jr., Goshen, KY (US)

( * ) Notice: Subject to any disclaimer, the term of this patent is extended or adjusted under 35 U.S.C. 154(b) by 68 days.

(21) Appl. No.: 10/265,050

(22) Filed: Oct. 4, 2002

(51) Int. Cl.[7] .............................................. B01D 21/34
(52) U.S. Cl. ..................... 210/97; 210/123; 210/128; 210/195.1; 210/532.2; 137/433; 137/448; 137/561 A
(58) Field of Search .......................... 210/97, 123, 128, 210/170, 194, 195.1, 196, 257.1, 532.2; 137/430, 433, 448, 561 A

(56) References Cited

U.S. PATENT DOCUMENTS

| | | | | |
|---|---|---|---|---|
| 41,753 A | * | 3/1864 | Beach | |
| 1,580,493 A | * | 4/1926 | Johnson | |
| 3,789,493 A | * | 4/1926 | Johnson | |
| 1,630,079 A | * | 5/1927 | Spalding et al. | 210/120 |
| 3,123,555 A | * | 3/1964 | Moore | 210/124 |
| 4,011,162 A | * | 3/1977 | Oldham et al. | |
| RE32,312 E | * | 12/1986 | Crates et al. | |
| 5,480,561 A | * | 1/1996 | Ball et al. | |
| 6,372,137 B1 | * | 4/2002 | Bounds | |

* cited by examiner

Primary Examiner—Terry K. Cecil
(74) Attorney, Agent, or Firm—Charles G. Lamb; Middleton Reutlinger

(57) ABSTRACT

A device for diverting the flow of liquid in a wastewater treatment system in flow communication with effluent returning from a recirculating treatment section and in flow communication with a discharge line for removing a portion of treated effluent to a receiving body. The device also has openings for returning a percentage of the effluent back to the wastewater treatment system. A valve operatively responsive to a float in the treatment system whereby when the effluent level in the system falls below a critical point, all of the effluent is recirculated back into the treatment system and when the effluent level rises sufficiently a percentage of cleaned effluent exits the system.

11 Claims, 7 Drawing Sheets

FUEL DIVERTER FOR A RECIRCULATING WASTEWATER TREATMENT SYSTEM

FIELD OF THE INVENTION

This invention relates to devices for diverting the path of flowing fluids in at least two directions, and more particularly to a system for recirculating a selected amount of wastewater in a wastewater treatment system.

BACKGROUND OF THE INVENTION

In the treatment of wastewater, such as sewage and the like, it is common to provide a septic tank with an inlet pipe from the source and an outlet pipe for discharge from the tank. Solids in the wastewater settle out to the bottom of the tank while the clarified effluent flows from the tank through the outlet pipe. Effluent leaving the effluent tank may undergo further filtration to remove remaining undissolved particulate materials by passing the effluent through screen filters or similar devices. The effluent may be transported to a second tank for further settling and treatment to remove harmful constituents. Finally, the effluent may be piped into a lateral field where it is passed into a soil bed.

Optionally, wastewater can be further treated before discharge into the environment by utilizing a recirculating system. After leaving the septic tank in a recirculating system, the effluent is passed through a treatment media, which cleans the effluent by filtration and/or bioremediation, and then back to the septic tank, to a separate recirculation tank or back through the filtering system. The filtering system may be a filter bed comprised of stratified, layers of sand, gravel or possibly organic matter, wherein the effluent is loaded into the top of the system and trickles through the system to the bottom for collection. The filtering system may include polyurethane or other types of open cell foam having a large surface area through which the effluent trickles and is treated by microorganisms in an aerobic environment.

At some point, the recirculating effluent passes out of the recirculating system and to a receiving body, for example a drain field. A mechanism diverts the filtered effluent to the receiving body. One mechanism utilized is to simply divert a portion of the total effluent returned from filtration through the filtering system. However, this potentially results in a percentage of the wastewater passing through the filtration system only once before discharge. Further, if a sufficient quantity of wastewater is not constantly added to the system to offset the constant flow out of the system, the water level may drop enough that the pumps are damaged by running dry and/or the filtering system dries out, killing essential organisms necessary for treatment of the effluent. Also, if the volume increases faster than the amount of effluent removed from the system, it can overflow.

Alternatively, a means of detecting either effluent flow or effluent level in the septic tank or recirculation tank is used to direct the effluent either out to a drain field or back into the treatment media. Thus, if effluent volume within the system is detected as reaching a critical maximum or minimum, a device seals one of the passages, either to the drain field or back into the system, and diverts the flow where it is needed. The sealing device may be a caged ball float that acts to seal a pipe when the water level within a tank rises enough to force the float over the pipe opening. This system has the disadvantage of diverting all or none of the effluent volume. Thus, it is possible that improperly filtered effluent can be discharged from the system if the level rises too high and all the effluent is diverted directly to the drain field. Further, the ball float makes an inferior valve in that it may not seal properly and is difficult to adjust so that it seals at the proper fluid level.

It would be advantageous to have a recirculation device for use in septic systems employing treatment media that sense the level of effluent and divert only a portion of the effluent when required. Such a system would have the advantage of ensuring adequate filtration of all effluent before discharge from the system. Such a system would be most beneficial for treatment systems where the flow volume varied greatly over time.

SUMMARY OF THE INVENTION

It is accordingly a primary object of the present invention to provide a recirculation device for use in recirculating septic systems that redirects a portion of flowing wastewater out of the system to a receiving body.

Further, it is an object of the present invention to provide such a recirculation device that is capable of sensing the volume of fluid within the system and when the volume reaches a critically low level, retain all of the fluid within the system so that it is continually recirculated until the fluid volume again rises above the critical level.

It is an even further object of the present invention to provide such a device wherein the percentage of fluid that is diverted to the receiving body can be determined by the user and also altered with relative ease by the user post-installation.

More particularly, the recirculating wastewater treatment system in which the present invention is used comprises a septic tank having an inlet pipe that discharges untreated wastewater into the septic tank from the waste source. The septic tank also has an outlet pipe that may or may not have a filter attached. While in the septic tank, the solids settle to the bottom of the tank and degrade while the clarified effluent flows out of the septic tank through the outlet pipe. The effluent may enter a second tank either separate from the septic tank or merely divided from the septic tank by a wall. The effluent undergoes further settling and separation of undissolved solids from the liquids while in the second tank. The effluent is pumped out of the second tank, or directly from the septic tank into a treatment media. This system further filters and purifies the effluent. The system may percolate the effluent through multiple porous strata, such as gravel, sand and/or peat that serves as a filtering media. Alternatively, and more preferably, the system may percolate water through an open cell foam having a large surface area colonized with bioactive microorganisms that serves as a filtering media and facilitates the degradation of organic contaminants within the effluent.

A percentage of the collected and cleaned effluent is recycled and returned via the recirculation device of the present invention to the tank(s) and passed again through the treatment media, while the remainder of the treated effluent is discharged to a receiving body, for example a drain field. Alternatively, if the recirculation device senses a critically low total fluid volume within the system, it will recirculate all of the cleaned effluent back through the system until the total volume increases above the critical level.

Specifically, the present invention is directed to a fluid diverting recirculation device located within a tank of a recirculating septic system. The tank may be a septic tank, a secondary settling tank, or a tank specifically for housing the recirculation device. The recirculation device is comprised of a splitter pipe in flow communication with the treatment media. The splitter pipe has openings therein that permit a percentage of the water returning from the treatment media to flow into the tank. The openings have flow leveling devices covering them that allow the user to direct the flow of water evenly out of each opening even if the splitter pipe is not level. The flow leveling devices can also be adjusted so that more or less effluent exits one or more openings than one or more other openings. This permits fine adjustment of the percentage of effluent that recirculates back into the system. The splitter pipe is further fluidly connected with a valve device, comprised of a valve conduit or housing and a valve mechanism, which in turn is fluidly connected with the receiving body. The valve conduit houses the valve mechanism, which is comprised of a valve, a valve guide rod connected to the valve and extending into the tank a predetermined distance, and a float attached to the rod and floating in the effluent. The valve moves vertically within the valve conduit in response to the effluent level within the tank raising or lowering the float. If the effluent level drops below a critical level, the valve will drop far enough that the flow communication with the drain field is blocked. This forces all of the effluent returning to the splitter pipe to exit through the openings in the splitter pipe and reenter the treatment media through the tank. When the effluent level in the tank rises above the critical level, the valve will rise and permit a percentage of the filtered effluent to exit to the drain field once again.

A better understanding of the invention will be had upon reference to the following description in conjunction with the appended claims and accompanying drawings in which like numerals refer to like parts throughout the several views.

BRIEF DESCRIPTION OF THE DRAWINGS

The invention is illustrated in the accompanying drawings wherein.

DETAILED DESCRIPTION OF THE PREFFERED EMBODIMENT

The device of the present invention is incorporated into a system that requires sensing of the fluid volume in the system and diversion of a preselected percentage of the fluid until a critically low volume is reached and then retaining all of the remaining fluid within the system until the fluid volume increases above the critical level. The device of the present invention is particularly well suited for recirculating wastewater in a wastewater treatment system.

Figure 1:
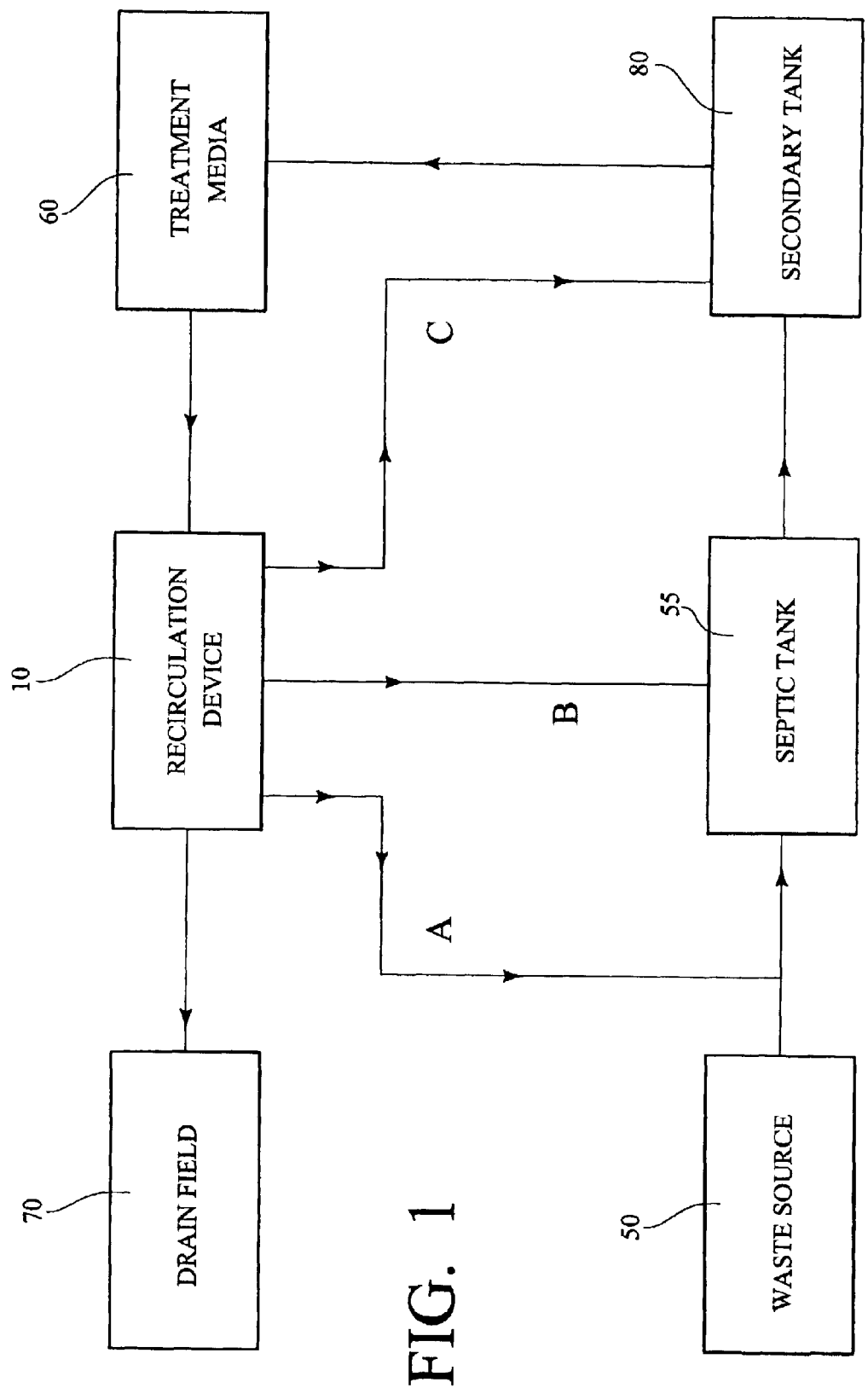
FIG. 1 is a schematic diagram illustrating the control of liquid flow through a recirculating wastewater treatment system.

FIG. 1 best illustrates schematically the general layout of such a system. Wastewater flows from a waste source 50 into a septic tank 55. Solids settle from the wastewater to the bottom of the tank. The clarified effluent 11 flows out of the septic tank 55 and usually through any of various types of filters, as is known in the art. Often the effluent 11 leaves septic tank 55 by gravity flow and enters into a secondary tank 80 for further settling and clarification. The secondary tank 80 may be a separate tank or it may be physically attached to the septic tank and divided by a wall with a flow communication through the wall. Secondary tank 80 generally includes a pump for pumping the effluent 11 to a treatment media 60. If a secondary tank 80 is not included in the system, the pump may be located within the septic tank 55. It is also possible to transfer the effluent 11 to the treatment media 60 by other means, such as gravity, if appropriate.

The treatment media 60 removes contaminants in the effluent 11 using a filtering media by one or more generally known approaches. Any of these approaches are applicable to the present invention and the examples provided below are not intended to limit the scope of the present invention. One example of a wastewater treatment system for recirculating a selected amount of wastewater utilizes small particulate filtering media such as sand, gravel or organic matter (such as peat) alone or together arranged as distinct strata. Wastewater is applied to the top of the system and allowed to percolate through the media where it is filtered and contaminants removed be microorganisms. The filtered effluent 11 collects at the bottom where it is pooled and either passed back through the system or all or a percentage is removed to a drain field or other disposal means. Another treatment system utilizes open cell foam as the filtering media. The foam used has a very large surface area that permits colonization by higher numbers of treatment microorganisms than is possible in a traditional system. This allows for treatment of a greater volume of effluent 11 within a smaller space.

The collected effluent 11 flows from the treatment media 60 to a recirculation device 10 of the present invention. If the total fluid volume of the system is adequate, the recirculation device 10 diverts a predetermined percentage of the treated effluent 11 out of the system into a receiving body, for example, a drain field 70, where the treated water is released to the environment. The remaining effluent 11 is recirculated back into the system where it passes again through the treatment media 60 for further treatment. However, if the recirculation device 10, detects that the total fluid volume in the system is below a critical amount, 100% of the effluent 11 is returned to the system and none is released to the environment until the volume increases above the critical amount once again.

The recirculation device may be positioned so that the effluent 11 is entered back into the system upstream of the septic tank 55, designated as A in FIG. 1. If the effluent 11 follows path A, then the recirculation device 10 may be housed in its own tank downstream of the treatment media 60. A conduit leading out of the recirculation device tank would then connect, for example at a T-junction, with a conduit carrying wastewater from the waste source 50 to the septic tank 55. Alternatively, the recirculation device 10 can be positioned so that it directs effluent 11 back into the system at the septic tank 55 via path B. In this scenario, the recirculation device 10 may be housed within the septic tank itself 55. Therefore, a conduit would carry treated effluent 11 from the treatment media 60 through the outer wall of the septic tank 55, and into the recirculation device 10 housed within septic tank 55. The recirculation device 10 could then dump effluent 11 diverted back into the system directly into the septic tank 55. The recirculation device 10 of the present invention may also be utilized in a system wherein the effluent 11 flows along a path C from the recirculation device 10 directly into the secondary tank 80. If this path is chosen, the recirculation device may be housed directly within the secondary tank 80, similar to the arrangement utilized when the recirculation device 10 is housed in the septic tank 55.

Figure 2:
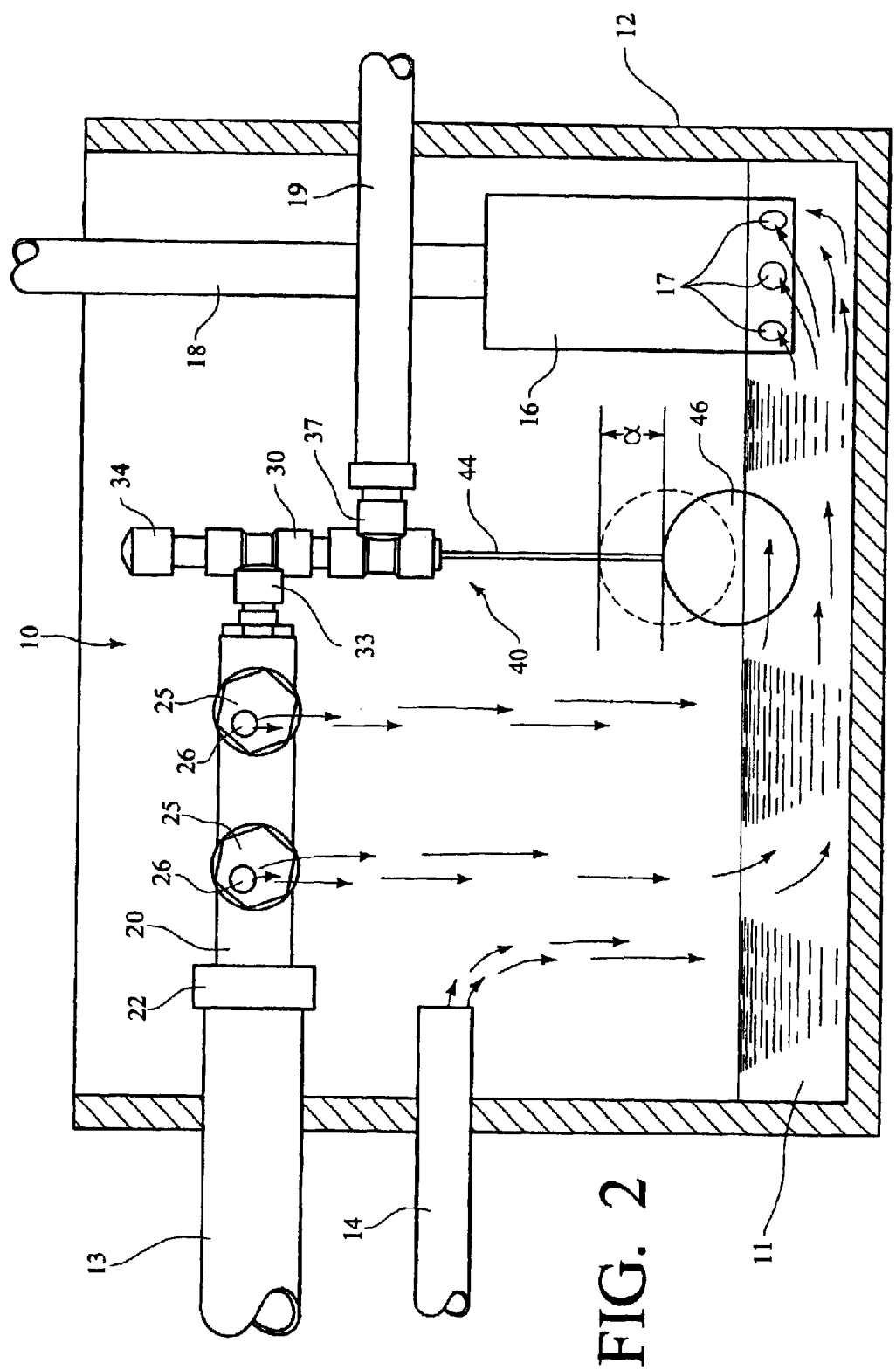
FIG. 2 is a side sectional view of a tank having within it the apparatus of the present invention as part of a recirculating wastewater treatment system.

FIG. 2 illustrates one example of how the recirculation device 10 may be housed. In this embodiment, the recirculation device 10 is housed in a tank 12, which as described previously may be a septic tank 55, a secondary tank 80 or even a separate recirculation device tank. Regardless of where the recirculation device 10 of the present invention is housed, in order for proper functioning, it must be housed so that a collection of effluent 11 pools in a basin beneath it. In this particular embodiment, the tank 12 is a septic tank 55. The septic tank 55 has a wastewater source line 14 that directs the flow of wastewater from the wastewater source 50 into the septic tank 55, where it pools and the solids settle to the bottom. The clarified effluent 11 may flow out of the septic tank 55 via gravity into a secondary tank 80 or even directly into the treatment media 60. Alternatively, the effluent 11 may flow through pump vault inlets 17 and into a pump vault 16 containing a pump (not shown) that pumps the effluent 16 out of the septic tank 55, through a recirculation outlet line 18 and into a secondary tank 80 or the treatment media 60.

Figure 4A:
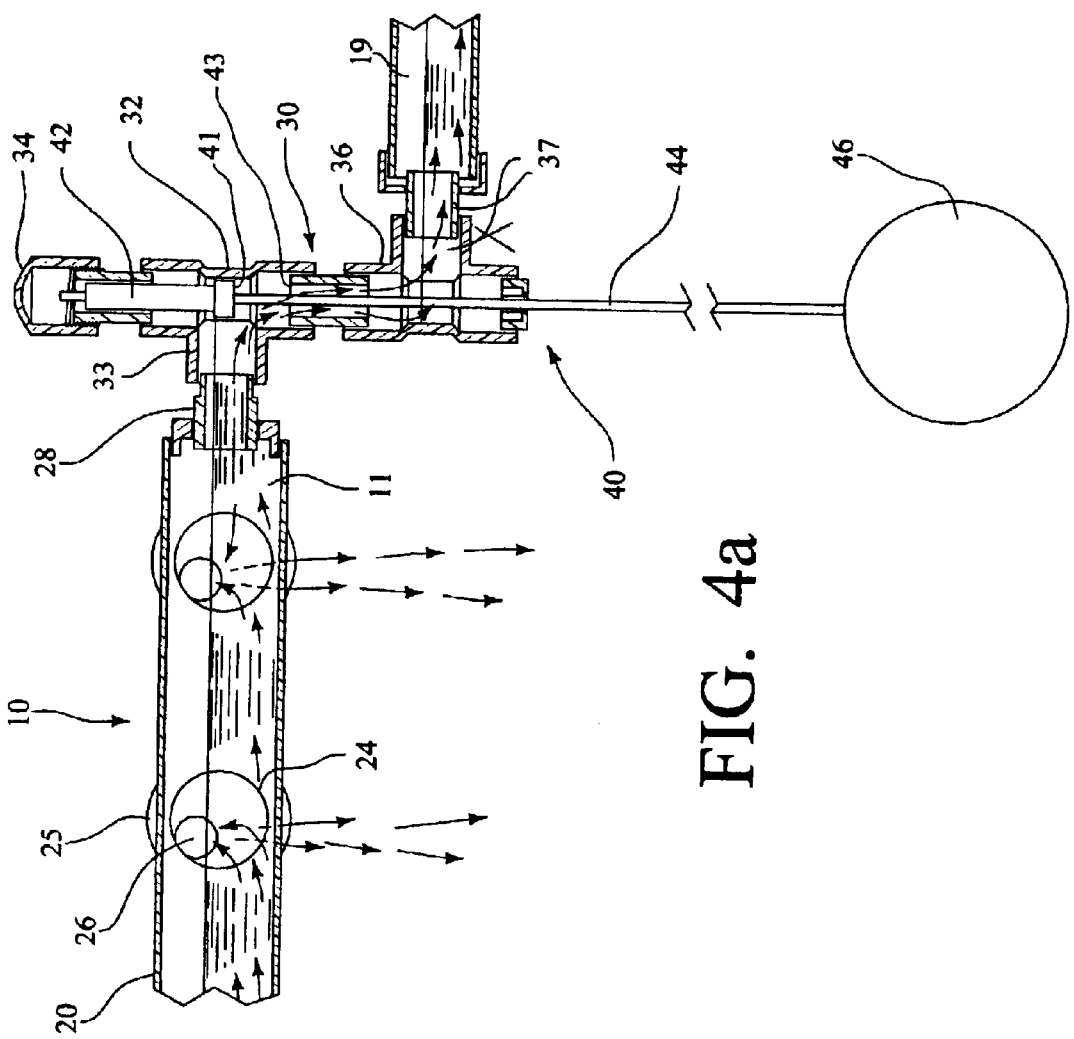
FIG. 4a is a side sectional view of the apparatus of the present invention showing the valve in its open configuration.
Figure 4B:
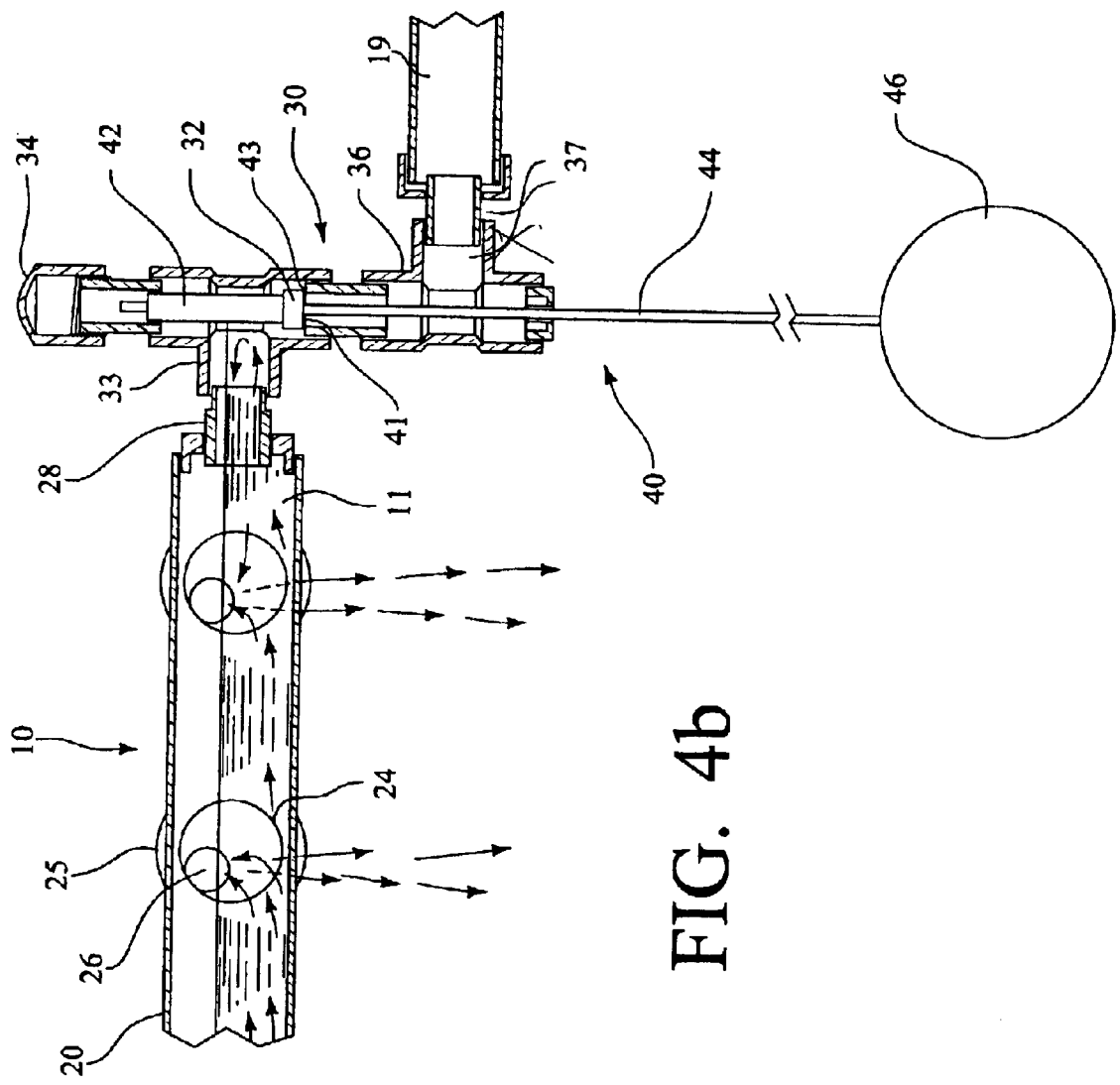
FIG. 4b is a side sectional view of the apparatus of the present invention showing the valve in its closed configuration.

After filtration of the effluent 11 through the treatment media 60, the effluent 11 returns, in this particular embodiment, to the septic tank 55 through recirculation inlet line 13 and into the recirculation device 10. Splitter pipe 20 of recirculation device 10 is fluidly connected with recirculation inlet line 13 at an inlet line coupling 22 surrounding a fluid inlet. Splitter pipe 20 has one or more return orifices 24 (see FIGS. 4a and 4b) that permit a portion of returning filtered effluent 11 to flow therethrough and back into septic tank 55, which permits reentry of that portion of the effluent 11 back into the system. If the fluid level in the septic tank 55 is above a predetermined critical level, the remaining percentage of treated effluent 11 that does not reenter the system by flowing through return orifices 24 will pass out of the splitter pipe 20 and into the fluidly connected valve conduit or housing 30. The valve conduit 30 has two openings, a splitter pipe coupling 33 where the effluent 11 enters and a discharge line reducing coupling 37 through which the effluent 11 exits the valve conduit. The splitter pipe 20 and valve conduit 30 can be of unitary body construction or assembled from individual components as shown in FIGS. 4a and 4b. After exiting the valve conduit 30, the remaining percentage of the effluent 11 enters the discharge line 19 through a fluid or discharge outlet which conveys the cleaned effluent 11 out of the system and into the environment, preferably to drain field 70.

Figure 3:
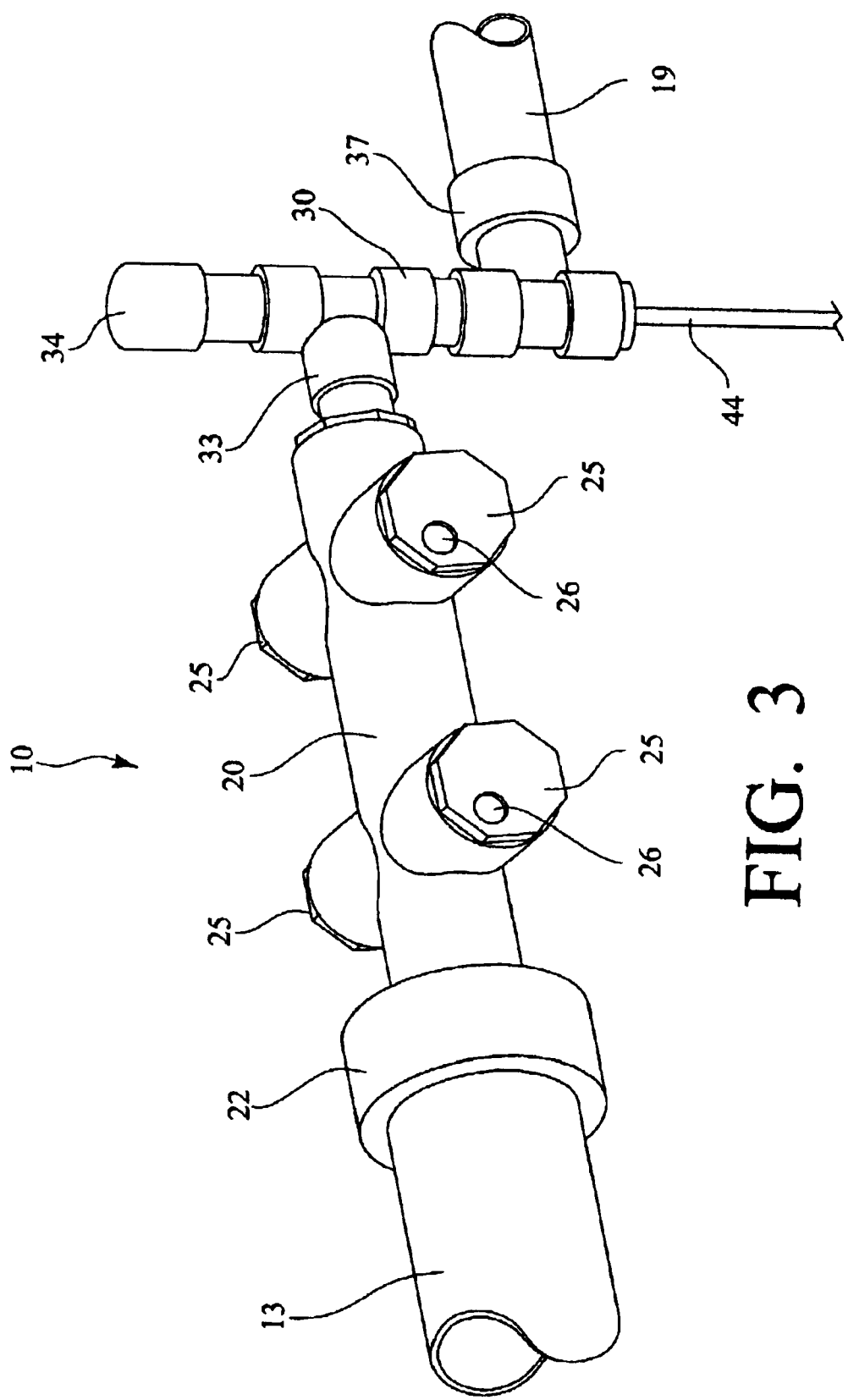
FIG. 3 is a perspective view of an embodiment of the apparatus of the present invention.

The percentage of effluent 11 shunted out of the system is variable and adjustable by the user, both before and after installation. First, more or less effluent 11 can be recirculated back into the system for further treatment depending on the number of return orifices 24 present in the splitter pipe 20 and the diameter of each return orifice 24. FIG. 3 illustrates a splitter pipe 20 having four return orifices 24 with equivalent diameters, two on each side of the splitter pipe 20. Fewer return orifices 24 would result in a smaller percentage of the total effluent 11 flow recirculating back into the system and more would result in greater volume return. For example, a splitter pipe 20 having four return orifices 24 recirculates 20% of the total effluent 11 volume back into the system through each orifice 24, or 80% of the total volume for all four orifices 24 combined. It is also possible to engineer orifices with different diameters, resulting in further variation in flow diversion.

To permit fine adjustment of flow out of the return orifices 24 post-installation, the return orifices 24 can each be fitted with flow levelers 25. If it is not possible to install the recirculation device 10 with the splitter pipe 20 horizontally level, each flow leveler 25 can be adjusted individually. This will assure that an equal amount of effluent 11 flows out of each return orifice 24. In operation, a flow leveler 25 is fitted to a return orifice 24, which can be rotated so that a flow leveler opening 26 is aligned on a horizontal plane with every other flow leveler opening 26 on each of the other return orifices 24. This assures equal flow out of each return orifice 24. Alternatively, if at some point post installation it becomes desirable to adjust the percentage of effluent 11 recirculating back into the system, one or more flow levelers 25 can be adjusted so that no effluent 11, or less than an amount equal to that exiting the remaining return orifices 24, flows through the flow leveler opening 26.

So long as the total fluid volume in the system is above a predetermined critical limit as measured by the valve mechanism 40 of the recirculation device 10, a percentage less than 100% of the total volume will recirculate back into the system and the remaining percentage is shunted out of the system through the recirculation device 10. However, if the total fluid volume in the system falls below the critical limit, the valve mechanism 40 of the recirculation device 10 will sense the level and seal the access to the discharge line 19. Thus, 100% of the effluent 11 then recirculates back through the system until the volume rises above the critical level. FIGS. 4a and 4b illustrate a mechanism of action for sensing and regulating the flow of liquid by the recirculation device 10.

In FIG. 4a, the volume within the system is above the predetermined critical level. The valve mechanism 40 senses the fluid volume within the system through contact with a float 46 with the effluent in a tank 12, in this embodiment, the septic tank 55. The float 46 is buoyant, therefore it floats in the effluent 11 (as shown in FIG. 2) and rises or falls in a vertical plane a distance a according to the effluent level in the tank 12. The vertical motion across distance α is transferred directly to a valve 42 via a rigid valve guide rod 44. Thus, when the volume in the system is sufficient for the float 46 to move the valve 42 upward, as shown in FIG. 4a, effluent 11 is able to flow both out of the flow leveler openings 26 in the splitter pipe 20, and also through an outlet opening having a valve conduit reducing coupling 28 at the downstream end of the splitter pipe 20. The valve conduit reducing coupling 28 is in flow communication with the splitter pipe coupling 33 through which a percentage of effluent 11 flows. With the valve 42 pushed upward by float 46, effluent 11 is permitted to flow through the lower half of valve conduit 30, a discharge T-connection 36, through the discharge line reducing coupling and into the discharge line 19. Discharge line 19 then removes this fraction of the effluent 11 volume from the system, for example into a drain field 70.

If the total fluid volume in the system begins to decrease, this decrease is reflected in the level of effluent 11 in the tank 12. In return, float 46 will also change its vertical position and drop lower into tank 12 (see FIG. 2). The vertical motion of float 46 is translated to valve 42 through valve guide rod 44, resulting in valve 42 moving downward in valve conduit 30. If the total fluid volume in the system decreases below a critical limit, valve 42 will lower its vertical position sufficiently so that a lower portion 41 of valve 42 will seal against a valve seat 43. As shown in FIG. 4b, when the valve is in its lowest vertical position, the lower portion 41 of valve 42 creates a watertight seal with valve seal 43 that prevents any effluent 11 from passing beyond the splitter T-connection 32 of valve conduit 30. Therefore, when the fluid volume of the system is below a critical level, the valve 42 seals against valve seat 43. This forces the percentage of effluent that would pass out of the system if the valve 42 was open back into the splitter pipe 20 where it exits from the recirculation device 10 through the return orifices 24 and recirculates back into the system. 100% recirculation of the effluent 11, when the total fluid volume is low, protects components of the wastewater treatment system from damage, such as pumps and microbiological colonies, which might occur if they are not constantly immersed in fluid. When the total fluid volume in the system begins to rise again, float 46 will move upward in a vertical direction and this motion will be transmitted to valve 42, thus resulting in the seal being broken and a portion of effluent 11 again passing out of the system through discharge line 19.

Positioning float 46 so that valve 42 seals valve conduit 30 when the total fluid volume reaches a critically low level is a simple matter. A valve guide rod 44 length is selected that is sufficient to position float 46 at a level in the tank 12 that moves valve 42 onto valve seat 43 only when the system volume reaches a predetermined critically low level. Should the distance between valve 42 and float 46 require adjusting after installation of the system, the recirculation device 10 can have an access cap 34 positioned at a top end of valve conduit 30. Access cap 34 can be threadably affixed to valve conduit 30. The user can remove access cap 34 and more easily gain access to valve 42 and valve guide rod 44 from the top of the recirculation device 10. The valve can then be moved vertically up or down on the guide rod 44 as needed in order to gain the preferred distance between valve 42 and float 46.

The mechanism of action for sensing and regulating the flow of liquid by the recirculation device 10 described above and shown in FIGS. 4a and 4b is just one of several possible mechanisms encompassed within the scope of the present invention. In simplest form, the mechanism of action is a valve conduit having a fluid inlet and a fluid outlet with a valve in opening and closing relation with the fluid inlet and outlet. A sensing means determines when the total fluid within the system reaches a predetermined critically low volume and then translates this signal to a mechanism that closes the valve, thus blocking the flow of fluid through the outlet. When the total fluid volume is above the critically low volume, the valve is in the open position and a percentage of the fluid is released from the system through the outlet. As a further example of the mechanism of action, FIGS. 5a and 5b show another mechanism within the scope of the present invention.

Figure 5A:
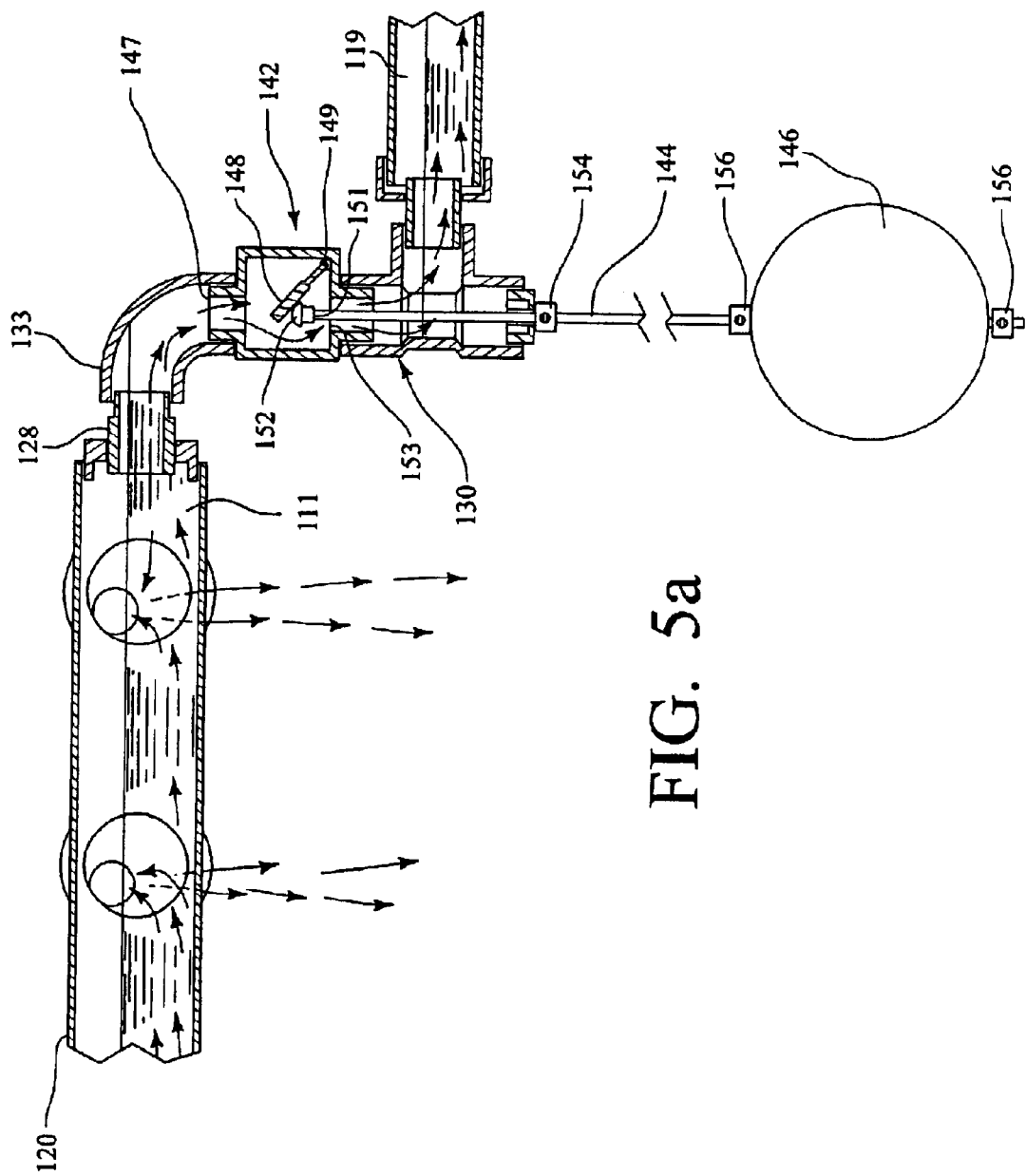
FIG. 5a is a side sectional view of another embodiment of the apparatus of the present invention showing the valve in its open configuration.
Figure 5B:
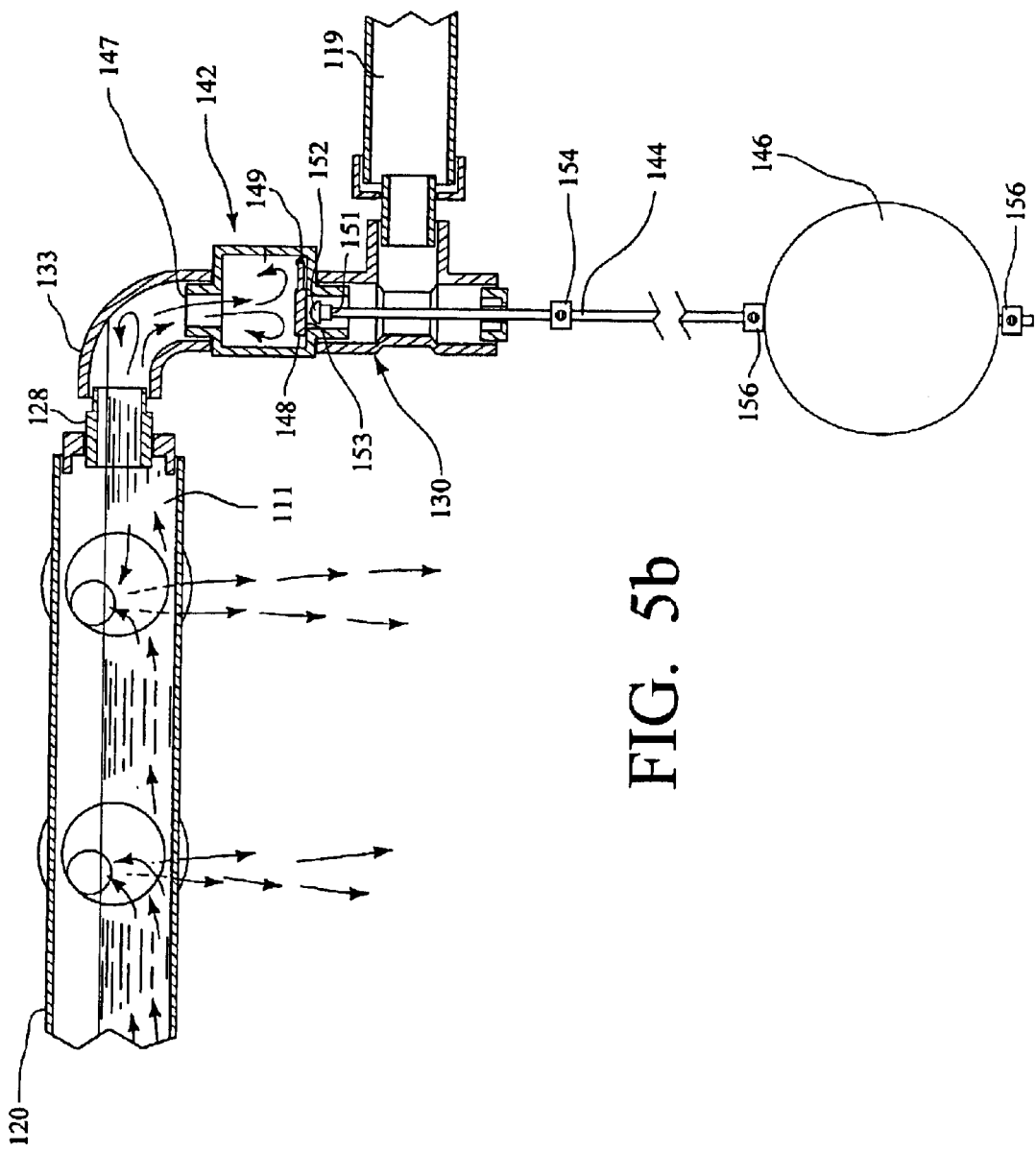
FIG. 5b is a side sectional view of the apparatus of the present invention showing the valve in its closed configuration.

FIGS. 5a and 5b show an alternative valve mechanism. As shown in FIG. 5a, a percentage less than all of an effluent 111 flows from a splitter pipe 120 into an inlet at a splitter pipe coupling 133 through a valve conduit reducing coupling 128. The effluent 111 then flows into an alternative valve mechanism, a check valve 142, through a check valve entrance 147. If the total fluid volume of the system is above the predetermined critically low volume, then a flapper seal 148 will be open and the effluent 111 will exit the check valve 142 through a check valve exit 153. The effluent 111 will then exit the system at a discharge outlet through a discharge line 119 as shown by the arrows in FIG. 5a.

Alternatively, if the total fluid volume of the system is below the predetermined critically low volume, then the flapper seal 148 will be closed and 100% of the effluent 111 will be returned to and recycled through the system, as indicated by the arrows in FIG. 5b. The flapper seal 148 is connected at an affixation point 149 to a wall of the check valve 142 is such a way that the flapper seal 148 can open and closed without becoming detached from the check valve 142. For example, the affixation point 149 can be a hinge as shown in FIGS. 5a and 5b. However, the affixation point 149 may also be one or more rivets or an adhesive.

The mechanism of sensing the total fluid volume and opening or closing the flapper seal 148 in this particular embodiment is similar to that shown in the embodiment shown in FIGS. 4a and 4b. A float 146 sits generally on the surface of a volume of effluent 11 in a tank 12 (see FIG. 2) and moves in a vertical plane in accord with the surface level of the effluent 11. A valve guide rod 144 is affixed at one end to the float 146 and has an end cushion 152 on the opposite upper end 152. The valve guide rod 144 extends through a valve conduit 130 that is in fluid communication with the check valve 142 and ends with the end cushion 152 in close proximity but not directly joined to the flapper seal 148. If the total fluid volume of the system is below the predetermined critically low volume, then the float 146 will sit low in the tank 12, resulting in the end cushion 152 not contacting the flapper seal 148. Thus, the check valve 142 will be in the closed position. When the total fluid volume rises above the critically low volume, the float 146 will rise and push the upper end of the valve guide rod 151 and the end cushion 152 against the flapper seal 148 and force it upward and open. The flapper seal 148 will remain held open so long as the total fluid volume remains above the critically low volume and a percentage of the effluent 111 will be able to exit through the discharge line 119 via the check valve exit 153.

A rod stop 154 can be slidably affixed to the valve guide rod 144. The rod stop 154 prevents the upper end of the valve guide rod 151 from extending beyond the flapper seal and potentially sticking the check valve 142 in the open position if the effluent 11 level drops. Further, one or more slidably adjustable float stops 156 can be utilized to vary the position of the float 146 along the valve guide rod 144 as needed for the float 146 to accurately detect the critically low volume.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the amended claims.

What is claimed is:

1. A recirculating wastewater treatment system, comprising:

a volume of wastewater derived from a wastewater source and contained within said wastewater treatment system;

a septic tank in flow communication with said wastewater source;

a treatment media in flow communication with said septic tank; and a recirculation device housed in a tank, said recirculation device having;

a) A horizontally extending pipe having an inlet opening in flow communication with said treatment media, an outlet opening in flow communication with said inlet opening at an opposed end of said horizontally extending pipe, and at least one orifice through a wall of said horizontally extending pipe, said orifice draining a first percentage of wastewater into said tank and said outlet opening diverting a second percentage of said wastewater out of said recirculating wastewater treatment system; and b) a valve conduit leaving an entrance opening in flow communication with said outlet opening of said pipe, a discharge outlet and a valve in opening and closing relation with said entrance opening and said discharge outlet, said valve conduit having a vertically extending elongated chamber, and said entrance opening being at an upper end of said elongated chamber and said discharge outlet being at an opposed lower end of said elongated chamber, said valve blocking said discharge outlet and preventing said second percentage of said wastewater from diverting out of said recirculating wastewater treatment system when said volume of wastewater is at a critically low point.

2. The recirculating wastewater treatment system of claim 1, wherein said treatment media is selected from the group consisting of sand, gravel, organic matter and combinations thereof.

3. The recirculating wastewater treatment system of claim 1, wherein said treatment media is an open cell foam.

4. The recirculating wastewater treatment system of claim 1, wherein said tank is a separate recirculation device tank, said recirculation device tank having an outlet pipe.

5. The recirculating wastewater treatment system of claim 4, said outlet pipe being in flow communication with said conduit from said wastewater source.

6. The recirculating wastewater treatment system of claim 4, said outlet pipe being in flow communication with said septic tank.

7. The recirculating wastewater treatment system of claim 1, wherein said tank is said septic tank.

8. The recirculating wastewater treatment system of claim 1, further comprising a secondary tank downstream of and in flow communication with said septic lank.

9. The recirculating wastewater treatment system of claim 8, wherein said tank is said secondary tank.

10. The recirculating wastewater treatment system of claim 1, wherein said valve conduit further comprises a valve rod having a top end and a bottom opposed end, wherein said bottom end is affixed to a float and said top end bring moveable in relation to movement of said float in a liquid.

11. The recirculating wastewater treatment system of claim 10, wherein said valve is a check valve having a flapper seal, and wherein said flapper seal is positioned above said upper end of said valve rod such that said upper end of said valve rod opens said flapper seal when said float is lifted by said liquid.

* * * * *